(12) United States Patent
Shanbhag Kota et al.

(10) Patent No.: US 12,425,985 B2
(45) Date of Patent: Sep. 23, 2025

(54) SMART EXTERNAL INTERFERENCE DETECTION AND AVOIDANCE FOR WIRELESS COMMUNICATION

(71) Applicant: Apple Inc., Cupertino, CA (US)

(72) Inventors: Sathish Shanbhag Kota, San Jose, CA (US); Vijay Kumar Ramamurthi, Milpitas, CA (US); Vijaykrishnan Ramakrishnan, San Jose, CA (US)

(73) Assignee: Apple Inc., Cupertino, CA (US)

( * ) Notice: Subject to any disclaimer, the term of this patent is extended or adjusted under 35 U.S.C. 154(b) by 555 days.

(21) Appl. No.: 17/947,964

(22) Filed: Sep. 19, 2022

(65) Prior Publication Data

US 2024/0098655 A1     Mar. 21, 2024

(51) Int. Cl.
*H04W 52/36*     (2009.01)
*H04W 52/02*     (2009.01)

(52) U.S. Cl.
CPC ..... *H04W 52/367* (2013.01); *H04W 52/0245* (2013.01)

(58) Field of Classification Search
None
See application file for complete search history.

(56) References Cited

U.S. PATENT DOCUMENTS

| | | | |
|---|---|---|---|
| 9,264,280 B1* | 2/2016 | Waheed | H04L 27/22 |
| 2013/0102267 A1* | 4/2013 | Haub | H04B 1/1036 |
| | | | 455/296 |
| 2017/0288916 A1* | 10/2017 | Mendel | H04B 17/318 |

* cited by examiner

*Primary Examiner* — Robert M Morlan
(74) *Attorney, Agent, or Firm* — Kilpatrick Townsend & Stockton LLP

(57) ABSTRACT

Techniques described herein are directed toward smart external interference detection and avoidance. An example method includes determining a first received signal strength indicator (RSSI) value of a received first signal across a radio band, wherein the first RSSI value is based at least in part on a second signal transmitted by an interfering device. The first received RSSI value is compared with a threshold value. A first gain adjustment value is determined for a receiver chain of the first computing device and a second gain adjustment value of a transmitter chain based at least in part on the comparison. A first gain of a first amplifier of the receiver chain is adjusted based at least in part on the first gain adjustment value. A second gain of a second amplifier of the transmitter chain is adjusted based at least in part on the second gain adjustment value.

20 Claims, 10 Drawing Sheets

SMART EXTERNAL INTERFERENCE DETECTION AND AVOIDANCE FOR WIRELESS COMMUNICATION

BACKGROUND

Wireless communication technology can include devices and methods for transmitting information over the air using electromagnetic waves, such as infrared (IR) and radio frequency (RF). A wireless network can be a computing network made up of network nodes that allow customers to remain connected without a physical connection to the network. Wireless telecommunication networks can include wireless local area networks (WLAN) providing service to small areas, such as homes and offices. Wireless networks can also include wireless metropolitan area networks (WMAN) providing service to wider areas outside of homes and offices, such as cities.

DETAILED DESCRIPTION OF THE INVENTION

Figure 1:
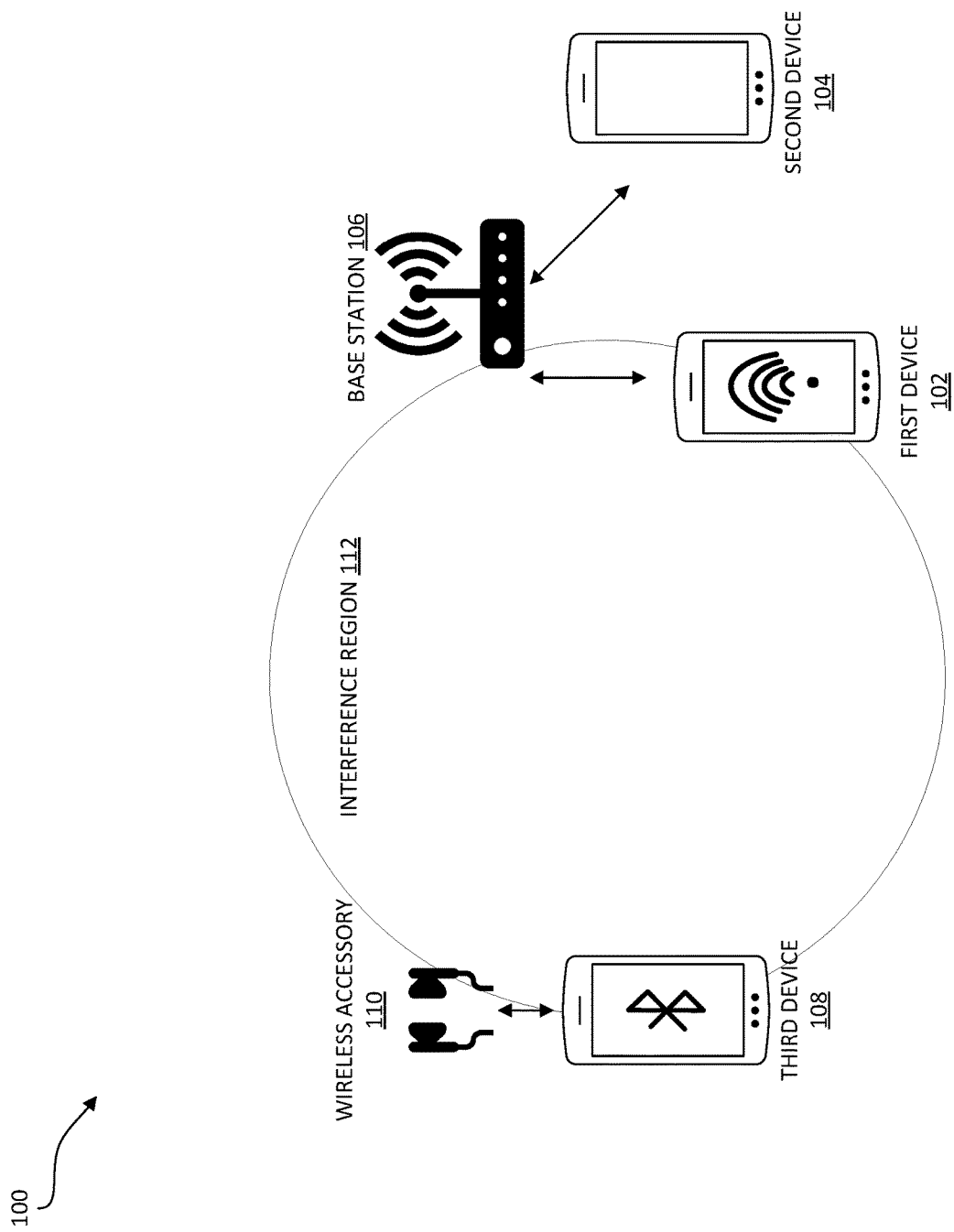
FIG. 1 is an illustration of a system for wireless communication, according to one or more embodiments.

In the following description, various embodiments will be described. For purposes of explanation, specific configurations and details are set forth to provide a thorough understanding of the embodiments. However, it will also be apparent to one skilled in the art that the embodiments may be practiced without the specific details. Furthermore, well-known features may be omitted or simplified in order not to obscure the embodiment being described.

Wireless devices can communicate over various bands of the electromagnetic spectrum. One such band, the industrial, scientific, and medical (ISM) radio band, can refer to a collection of frequency bands to be used by communication devices for industrial, scientific, and medical purposes. On one hand, a user can operate over the ISM band without the necessity of a license. On the other hand, user cannot expect a regulatory framework to assist with mitigating communication interference. As time progresses, the ISM bands are becoming more accepted for use with low-power, short range communication systems. As a result, more low-power, short range devices, such as Bluetooth devices, smartphones, Wi-Fi systems, and near field communication (NFC) systems can be configured to operate over the ISM band.

Bluetooth can be a protocol for short-range wireless technology that enables wireless-two-way communication between devices over a short distance. Bluetooth devices can exchange information over a short distance without relying upon Wi-Fi, mobile, or cellular communication. To initiate an exchange of data between Bluetooth devices, the devices can exchange information with each other or "pair" with each other. One paired, the Bluetooth devices can remember each other's registration information and reconnect as needed. Under the current standards, the devices can communicate with each other, via a Bluetooth protocol, over a 2.4 GHz band frequency, which can fall within the ISM band.

Wi-Fi can be protocol for enabling communication between multiple via a wireless internet connection. A device using a WI-Fi protocol to communicate can receive binary code and translate the code into a radio signal. The radio signal can be transmitted to a wireless router. The router can decode the radio signal into a binary code and transmit the data to a destination over the internet. The process can be reversed, the wireless router can receive a binary code and transform the code into a radio signal. The wireless router can transmit the radio signal to a device via an antenna-to-antenna connection. The device can decode the radio signal into binary code and process the information. Under the current standards, the devices can communicate with each other, via a Wi-Fi protocol, over a 2.4 GHz band frequency, which can fall within the ISM band.

In some instances, a first device can be operating in proximity to another device. The first device can be a device communicating with another device via a short-range protocol, such as Bluetooth. For example, the first device can be a smartphone connected to a speaker, via Bluetooth, to play music from a streaming service. The second device can be communicating via a low bandwidth connection to a base station or via a mesh network with low bandwidth. The user of the second device can be attempting to transmit a message to another device. For example, the user can transmit a message in the event of an emergency. However, the first device can be emitting a signal that interferes with the messaging.

In some instances, the first device and the second device are operating within a physical proximity and at close frequencies, such that the signal from the first device can create interference for the signal of the second device. For example, the first device can be communicating, via a Bluetooth protocol, to an accessory, such as a speaker. The second device can be attempting to send an emergency message, via a Wi-Fi protocol, because no other protocol (e.g., cellular) is available. Each of the first device and second device can be transmitting within the ISM band and more particularly within the 2.4 GHz band. As described above, the second device can be receiving in a low bandwidth context and given the proximity, the Bluetooth signal can overpower the Wi-Fi signal and interfere with the Wi-Fi signal.

Conventional methods for mitigating the interference can include reducing the transmission power of the Bluetooth device, an automatic frequency hopping (AFH) mask, in which each device can be prohibited from hopping to a respective frequency. However, given the proximity between the devices, these techniques can be ineffective.

Embodiments described herein address the above-described issues by providing systems and methodologies for smart external interference detection and avoidance. A device communicating via a Wi-Fi protocol, can receive a signal and measure the received signal strength indicator (RSSI) of the signal. The device can compare the measured RSSI to a threshold value. If the RSSI value is lower than the threshold value, the device can continue to receive and transmit per its protocol. If, however, the measured RSSI value is greater than the threshold value, then the device can presume that another device is causing signal interference that can distort the Wi-Fi signal. In response, the device can further adjust a gain at a receiver front end (FE) to achieve receiver linearization to suppress any non-linear distortion caused by the interference signal. The device can further adjust a gain at the transmitter backend prior to transmitting a signal to the target source.

FIG. 1 is an illustration of a system 100 for wireless communication, according to one or more embodiments. A first device 102 can attempt to communicate via messaging (e.g., short message service (SMS), rich communication service (RCS)) with a second device 104 via a base station 106. The base station 106 can include, for example access point, router, radio tower, satellite, for enabling the first device 102 to communicate, via a Wi-Fi protocol, to the second device 104. In some instances, the base station 106 can, for various reasons, provide poor, low-bandwidth coverage, such that a device communicating via a Wi-Fi protocol, has a weak or no cellular signal. Therefore, in response, the first device 102 can communicate via a Wi-fi protocol.

As illustrated, a third device 108 can be in proximity of the first device 102. The third device 108 can communicate with a wireless accessory 110 via a Bluetooth protocol. As illustrated, the third device 108 can be in communication with a pair of wireless headphones via a Bluetooth protocol. The communication between the third device 108 and the wireless accessory 110 can emit a signal that can interfere with the communication of the first device 102. For example, the first device can receive a signal from the base station 106. The first device can further receive a signal from the third device 108, where a frequency of the signal from the third device is close to the frequency of the signal from the base station 106. In some instance, the first device 102 can combine the signal from the base station 106 and the signal from the third device 108. This can create an intermodulation signal that distorts the information carried by the signal from the base station 106.

The area surrounding the third device 108 in which a communication of the first device 102 can be called an interference region 112. Therefore, if the first device 102 remains in the interference region 112, a signal from the third device 108 (or the wireless accessory 110) can continue to interfere with the communication between the first device 102 and the base station 106.

Therefore, embodiments described herein, provides a methodologies, systems, and computer-readable mediums that permit a device (e.g., first device 102) to detect that an aggressor device (e.g., third device 108) is emitting an interfering signal. The device can further be configured to adjust a gain at a receiver chain and a gain at transmitter chain to mitigate any distortion caused by the aggressor device signal. In addition, in some embodiments, upon detecting an interference signal, the device can provide a notification via a graphical user interface (GUI) that another device's signal is causing interference. In other embodiments, the device can present multi-dimensional (e.g., two dimensional or three dimensional) directions to the user to guide the user away from the interference region.

Figure 2:
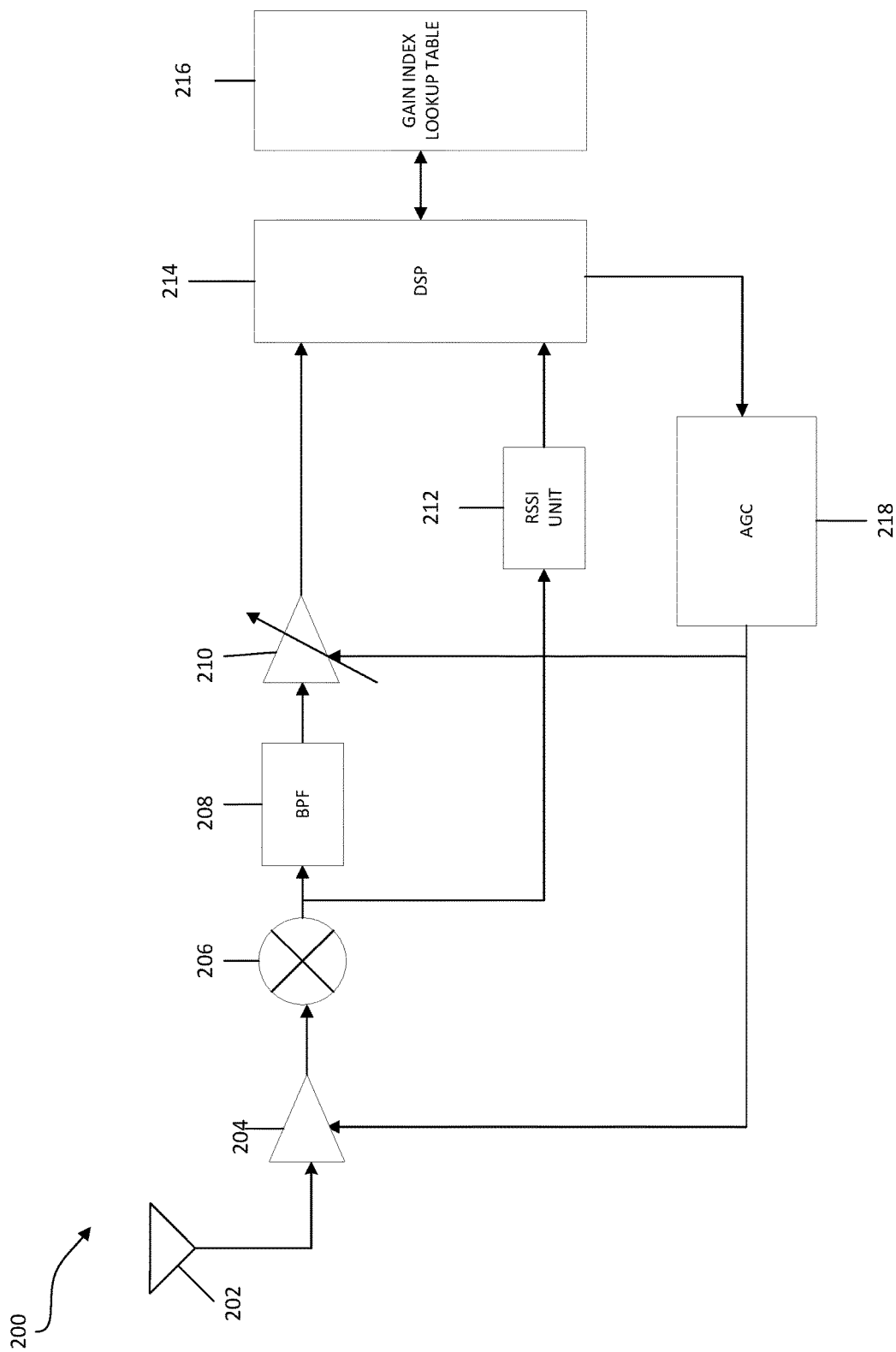
FIG. 2 is an illustration of receiving circuitry for smart external interference detection and avoidance, according to one or more embodiments.

FIG. 2 is an illustration of receiver circuitry for smart external interference detection and avoidance, according to one or more embodiments. It should be appreciated that the illustrated receiver circuitry includes a subset of receiver elements forming a receiver chain, and a person having ordinary skill in the art can recognize that additional components and configurations can be included for the receiver chain. An antenna 202 can receive a signal and transmit the signal to a low noise amplifier (LNA) 204. The LNA 204 can be used to amplify weak analog signals transmitted from the antenna 202. The LNA 204 can further be configured to amplify the signal to minimize signal loss while introducing minimal noise. The LNA 204 can transmit the amplified signal to a mixer 206, where the mixer can transform the received signal frequency to another frequency. In some embodiments, the mixer 206 can be a three-port device with two inputs and one output. One of the two inputs can receive the amplified signal from the LNA 204, while the other input can receive a signal from a local oscillator (LO). The mixer 206 can transform the received signal frequency by either adding the two input frequencies or by taking a difference of the two frequencies to downconvert the received signal frequency to an intermediate frequency (IF). Downconverting the received signal frequency to an IF can assist with digital signal processing and managing receiving signals having different frequencies.

The output signal of the mixer 206 can be directed toward a bandpass filter (BPF) 208 and an RSSI unit 212. The BPF 208 can be an IF BPF that can be used to isolate certain frequencies and filter out other frequencies. The BPF 208 can be configured to allow frequencies within a target frequency band pass through, while filtering out other undesired frequencies.

The BPF 208 can transmit an output signal to a variable gain amplifier (VGA) 210. The VGA 210 can be a device that can introduce a variable signal gain based on a control input. It should be appreciated that although a single VGA is illustrated, the receiving circuitry 200 can include more than one VGA.

The RSSI unit 212 can measure the signal strength of the output signal of the BPF 208. The RSSI of a signal can be an estimation of the power of the signals received by the antenna 202.

Each of the VGA 210 and the RSSI unit 212 can output a signal to a digital signal processor (DSP) 214. The DSP 214 can include circuitry for measuring and filtering digital signals. The DSP 214 can further process the signals using one or more signal processing algorithms.

The DSP 214 can receive the RSSI measurement from the RSSI unit 212 and compare the RSSI with a threshold value. in some embodiments, the DSP 214 can be pre-configured with one or more threshold values. If the RSSI value is greater than the threshold value, then the DSP 214 can assume that another signal (e.g., from the third device 108) is interfering with a signal to or from a base station. If, however, the RSSI value is less than the threshold value, then the DSP 214 can assume that another signal is not interfering with a signal to or from a base station.

If the RSSI value is greater than the threshold value, the DSP 214 can adjust a gain at one or more elements of receiving circuitry 200. For example, the DSP 214 can issue control instructions to an automatic gain control (AGC) 218. The AGC 218 can include circuitry for increasing or decreasing a gain of an amplifier or the receiving circuitry 200. As illustrated, the AGC 218 can control a gain of the LNA 204 and the VGA 210. In some embodiments, the receiving circuitry 200 can include additional amplifiers, and the AGC 218 can increase or decrease a gain of one or more of the additional amplifiers. In practical applications, the AGC 218 can be more likely to decrease a gain for a received signal and increase a gain for a signal to be transmitted.

To determine a gain adjustment value, the DSP 214 can communicate with a gain index lookup table 216. The gain index lookup table 216 can be a data structure that holds gain adjustment values, wherein each gain adjustment value is based on a difference between the RSSI value and the threshold value. Each gain adjustment value can be associated with a decrease or increase of an amplifier gain. As indicated above, the amount of increase or decrease in gain can be configured to suppress non-linear distortion created by interfering signal.

The antenna 202 can be continuously receive transmission data packets during a session. Therefore, the RSSI unit 212 can continuously measure the RSSI of the received signal. The RSSI of a signal can change and, at times, be greater than the threshold value or less than the threshold value. The change in the RSSI value can be attributed to, for example, the interfering device beginning to transmit or ceasing to transmit, or the interfering device being greater distance or lesser distance away. To account for a change in the RSSI, the DSP 214 can continuously compare the current RSSI value to the threshold value. In the instance that the RSSI value is greater than the threshold value and the difference between the RSSI value and the threshold value has changed, the DSP 214 can perform another look up of the gain index look up table and determine and a new appropriate gain for each respective amplifier of the device (e.g., first device 102).

Although only a single antenna 202 is illustrated, a device (e.g., first device 102) can include multiple antennae. Each antenna can be arranged spatially apart and at different locations on the device. Based on the antenna arrangement, the power of a received signal can be different based on the location of each antenna. Therefore, the device can measure the signal strength at each antenna and can switch between antennas to receive the strongest signal.

Figure 3:
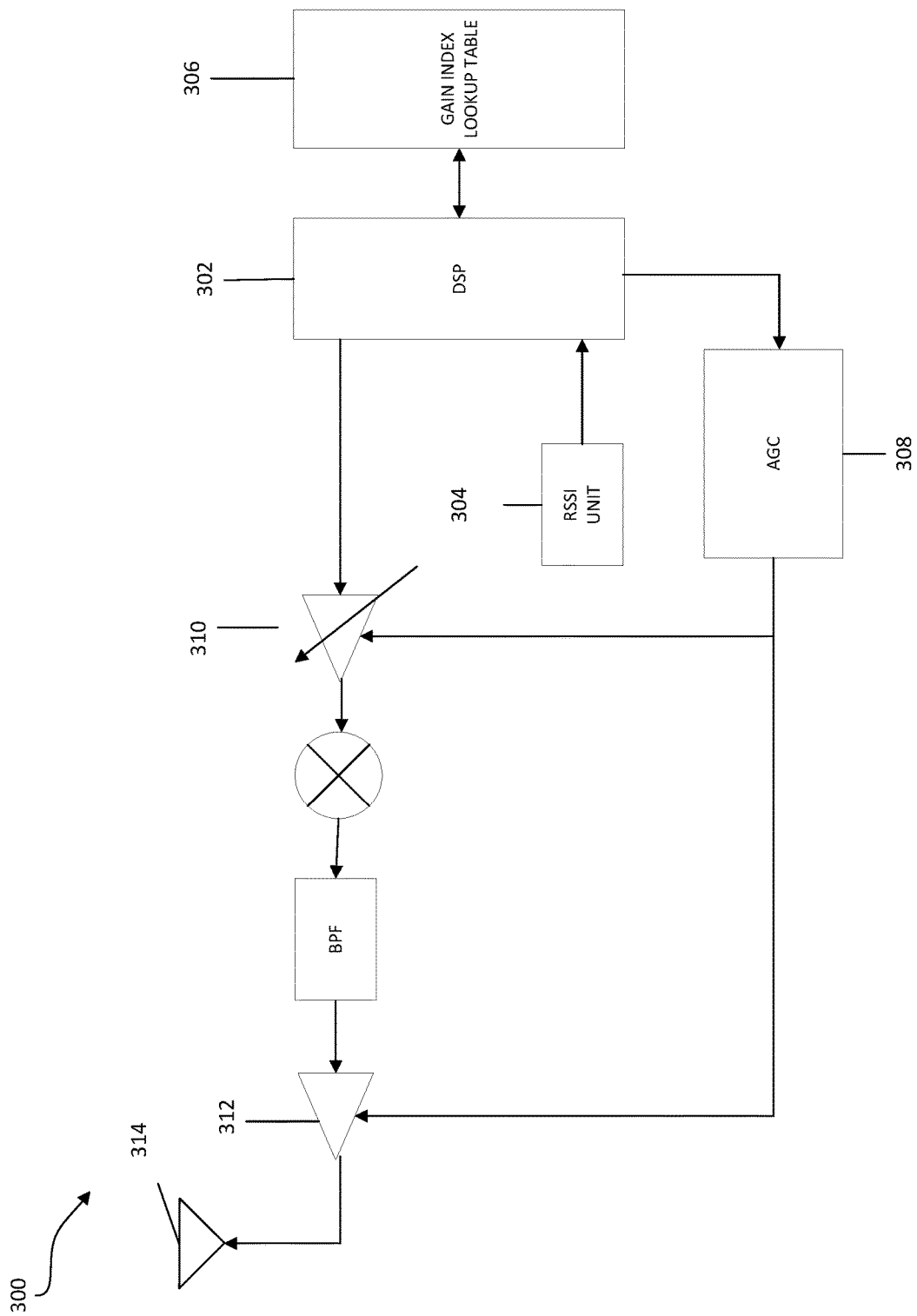
FIG. 3 is an illustration of a transmitting circuitry for smart external interference detection and avoidance, according to one or more embodiments.

FIG. 3 is an illustration of a transmission circuitry 300 for smart external interference detection and avoidance, according to one or more embodiments. It should be appreciated that the illustrated transmission circuitry 300 includes a subset of transmission elements of a transmitter chain, and a person having ordinary skill in the art can recognize additional components and configurations can be implemented for the transmitter chain. For example, the transmission circuitry 300 can include a digital to analog convertor (DAC).

A DSP 302 can receive an RSSI value from an RSSI unit 304. The DSP 302 can be the same as the DSP 214 of FIG. 2 and the RSSI unit 304 can be the same as the RSSI unit 212 of FIG. 2. As described above, the DSP 302 can compare the RSSI value with a threshold value. Based on the comparison, the DSP 302 can retrieve a respective gain adjustment value for each amplifier of the transmission circuitry 300 from a gain index lookup table 306. The gain index lookup table 306 can be the same as the gain index lookup table 216 of FIG. 2. The DSP 302 can further use an AGC 308 to increase or decrease the respective gain at each amplifier of the transmission circuitry 300. The AGC 308 can be the same as the AGC 218 of FIG. 2. For example, in response to the RSSI value being greater than a threshold value, the DSP 302 can use the AGC 308 to adjust the gain at a VGN 310 and a power amplifier 312. In practical application the AGC 308 can increase the gain for the transmission circuitry amplifiers. Increasing the gain and the transmission circuitry 300 can complement a reduction in gain at the receiving circuitry 200. The combination of the decrease and increase in gain can be directed to removing the non-linear distortion caused by the interfering signal.

The transmission circuitry 300 can transmit a signal via the antenna 314. In some embodiments, the antenna 314 is the same antenna 202 of FIG. 2. For example, the receiving circuitry 200 and the transmission circuitry 300 can include a common switch, for switching the antenna between transmission and reception.

Figure 4:
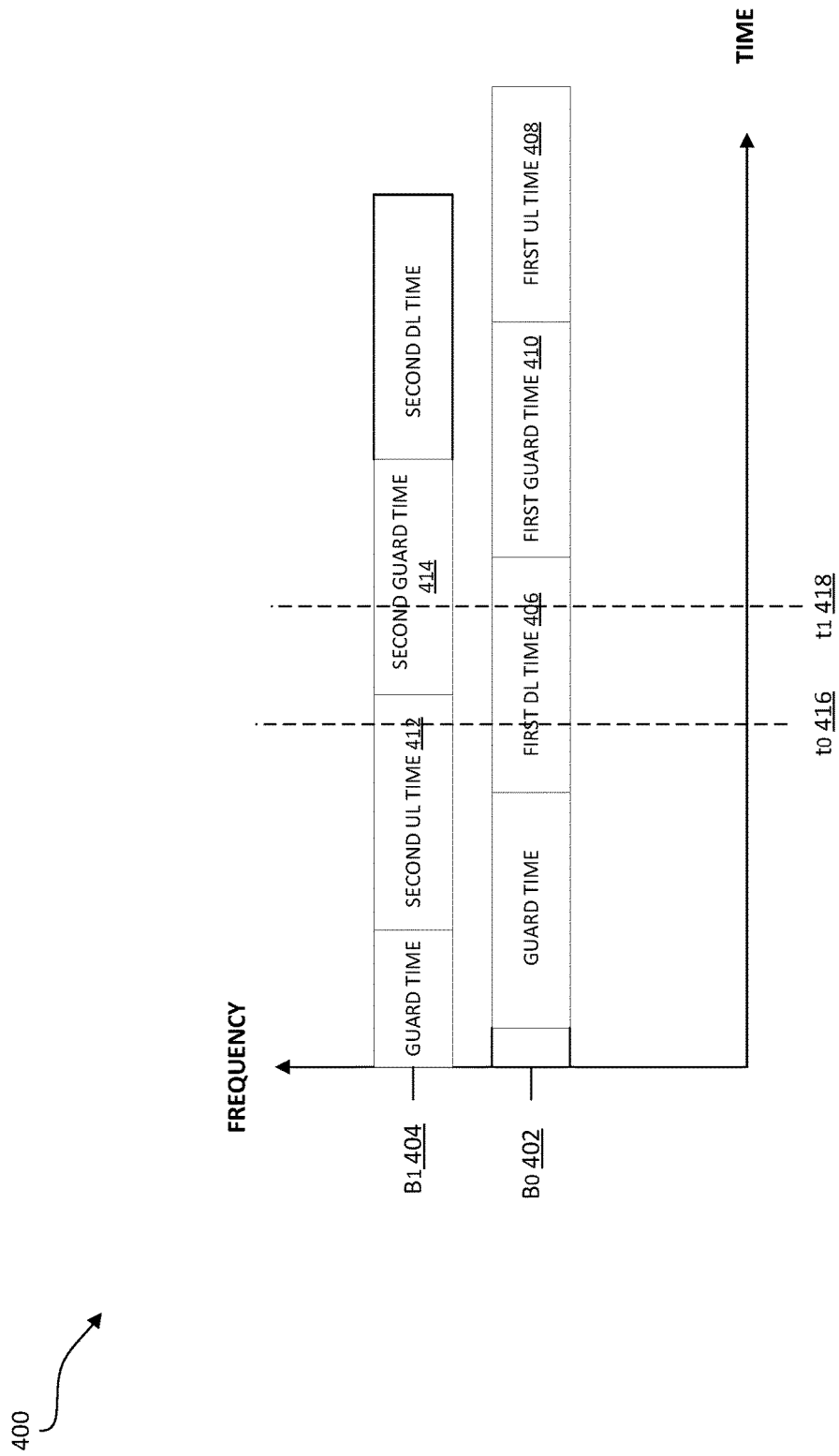
FIG. 4 is an illustration of time duplexing division (TDD), according to one or more embodiments.

The threshold value can be based on various factors. For example, the threshold value can be based on a duplexing scheme of the interfering device. FIG. 4 is an illustration of time duplexing division (TDD), according to one or more embodiments. A duplexing mode can determine how spectrum is allocated during uplink (UL) and downlink (DL) transmissions. Devices that are receiving and transmitting using a Bluetooth protocol or a Wi-Fi protocol can each implement a TDD mode. A device (e.g., first device 102) can engage in UL and DL transmissions over a first band, $B_0$, 402. The device's UL and DL transmissions can be divided into time slots. For example, the device can be scheduled for a first DL time slot 406, for receiving DL transmissions. The device can further be scheduled for a first UL time slot 408, wherein the first UL time slot 408 occurs at a different time than the first DL time slot 406. To hinder the device from transmitting and receiving at the same time, a guard time slot (e.g., first guard time slot 410) can be scheduled between the first DL time slot 406 and the first UL time slot 408. During the guard time slot, the device does is not scheduled to transmit or receive.

An interfering device (third device 108) can also implement a TDD mode (e.g., a frequency hopping TDD mode). As illustrated, the interfering device can operate over a second band, $B_1$, 404. The first band, $B_0$, 402 can be adjacent to the second band, $B_1$, 404. The interfering device can be scheduled for a second UL time slot 412 followed by a second guard time slot 414. As seen in FIG. 4, the UL/DL time slots of the device overlap in time with the UL/DL time slots of the interfering device. Take, for example, a first time, $T_0$, 416, where the first DL time slot 406 of the device can overlap in time with the second UL time slot 412 of the interfering device. Additionally, at a second time, $T_1$, 418, the first DL time slot 406 of the device can overlap in time with the second guard time slot 414 of the interfering device. It can be expected that the RSSI value at $T_0$ is different than the RSSI at $T_1$. Therefore, in some embodiments, A DSP (e.g., DSP 214, DSP 302) can compare an RSSI value to multiple thresholds, where each threshold considers an expected state of the device (e.g., transmitting, receiving, idle).

The threshold can also be device specific. A device (e.g., first device 102) can be configured with particular blocking characteristics, where the characteristics describe the device's ability to receive a target signal in view of an interfering signal. Receiver blocking can occur in one of three ways, a preamplifier overload, a mixer overload, and an ADC overload. Receiver blocking can further diminish the performance of a device connecting to a low bandwidth network. A device can be tested to determine the measure of a device's blocking characteristics. As the blocking characteristics of a device type are determined, one or more threshold values can be adjusted to account for the characteristics.

As described above, in addition to adjusting an amplifier gain to suppress non-linear distortion caused by an interference signal, the embodiments herein relate to a user interface (UI) for alerting a user of the interference signal and for guiding the user away from an interference region.

Figure 5:
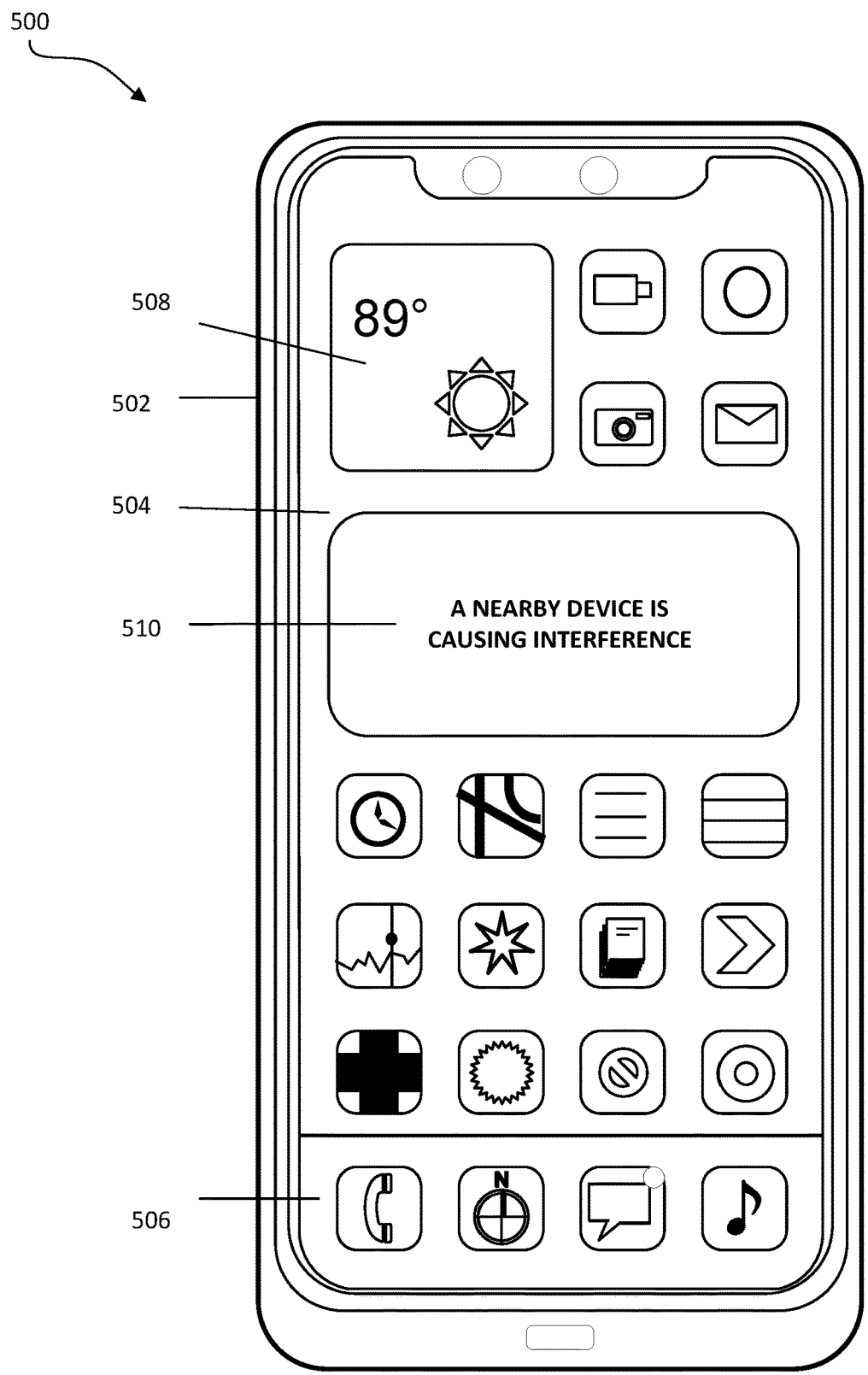
FIG. 5 is an illustration of a user interface (UI) displayed on a user device, in accordance with one or more embodiments.

FIG. 5 is an illustration 500 of a user interface (UI) displayed on a user device, in accordance with one or more embodiments. The user device 502 can be any device, such as a laptop computer, tablet computer, smart phone, wearable computing device, or other systems having any desired form factor. A UI 504 can be displayed on the user device 502. The UI 504 can provide a visual representation of a collection of applications that a user can interact with. A user can engage with an application by either clicking on an icon via a touch screen of the user device 502, or through a virtual assistant via an audio input, such as Siri. The UI 504 can include a set of icons 506, such as Phone for calling, Compass, Messages (SMS and MMS) for message, Web browser, and Music Store. The UI 504 can further include widgets such as weather widget 508, where an icon can be static, and a widget can be dynamic. For example, a widget can modify its appearance in response to an input, such as including animation describing a current weather pattern.

The UI 504 can include an interference widget 510 for alerting a user that another device is causing interference with respect to the user device 502. The interference widget 510 can provide a textual warning to the user. As illustrated, the interference widget 510 is displaying a textual message that, "A nearby device is causing interference." In other embodiments, the textual message can be a similar message that provides the user notice of an interfering device. In yet other embodiments, the interference widget 510 can include a static symbol or animation along with the textual message. In yet other embodiments, the interference widget 510 can only include a static symbol or animation. In some embodiments, the interference widget 510 can be dynamically displayed on the UI 504. For example, in some embodiments, the interference widget 510 can remain hidden until a triggering mechanism causes the interference widget 510 to be displayed. The interference widget 510 can be triggered to provide notice based on various factors. In some embodiments, the triggering mechanism can be that the user device 502 has detected that an RSSI value of a received signal is greater than a threshold value. It should be appreciated that in other embodiments, the interference widget 510 can be in the form of an icon, such a battery life icon or Wi-Fi signal strength icon.

The user device 502 can be in an area having poor cell coverage. There can be numerous reasons as to why the user device is experiencing a low-bandwidth connection, for example, the router is positioned poorly or performing poorly, too many nearby devices are causing the Wi-Fi to be congested, noise generated from other devices, a slow virtual private network (VPN), slow network connection, poor cellular coverage, and poorly performing user device. The cellular coverage can be poor enough that the user can elect to use Wi-Fi protocol to transmit a message (SMS or MMS). In addition to a low bandwidth connection, another user can be using another device that is generating a signal that interferes with the communication user device 502. For example, the user can be at a remote lake house trying to send a message via a Wi-Fi, and another user can be nearby and using their device to communicate with a wireless accessory (e.g., using their smartphone to stream a music service through a portable speaker). The communication between the smartphone and the portable speaker via a Bluetooth protocol can interfere with a communication between the user device 502 and, for example, a wireless router.

The user device 502 can include one more antenna for receiving and transmitting a signal. Each antenna can be distributed at various positions at the user device 502. The computing device can further include software and hardware for measuring an RSSI of a received signal. In some instances, the user device 502 is in an area with poor cellular coverage and the user may need to send a message or call to another user. As a result of the poor cellular coverage, the user can elect to send the message or call via a Wi-Fi protocol. In some instances, another user can be using their device to transmit using a short-range protocol, such as Bluetooth. The transmission from or the reception to the other user's device can create an interference region.

The user device 502 can be communicating with a wireless node, such as a router over a first frequency and the other device can be communicating with a short-range wireless (e.g., Bluetooth) device over a second frequency. The first frequency can be close to the second frequency. For example, the first frequency can be included in a first band and the second frequency can be included in a second band that is adjacent to the first band. Furthermore, a signal strength of the transmission from or the reception to the other user's device can be greater than the signal strength of the transmission from or the reception to the other user device 502. Therefore, even if the user device 502 is configured to receive a signal having the first frequency, the second frequency can be close enough such that user device 502 cannot filter out the second frequency. This can cause interference with a signal received by the user device 502. For example, the interference signal can be combined with the receiver user device signal at a mixer to create an intermodulation signal. If the intermodulation signal reaches the digital signal processer, the intended information to or from the user device 502, can be distorted.

As described above, embodiments described herein can mitigate an interference by detecting the presence of the interference signal, via an RSSI measurement, and adjusting the gain at the receiving circuitry and the transmitting circuitry. If the user device 502 does receive a signal, the user device 502 can further compare the RSSI value to a threshold value. If the RSSI value is greater than the threshold value, the user device 502 can conclude that a signal from another device is interfering with a signal to or from the user device 502.

If the user device 502 concludes that another device's signal is causing interference, the interference widget 510 can be displayed on the UI 504. The interference widget 510 can display a textual and/or visual notification that another device is causing interference. The purpose of the interference widget notification can be either to alert the user to ask the user of the other device to turn their device off, move their device away from the user device 502, or to move the user device 502 away from the other device. The user device 502 can continuously measure the RSSI of signals over the ISM band. Therefore, once the RSSI measurement no longer indicates that an interfering signal is present (e.g., the RSSI value is lower than one or more threshold values), the user device 502 can cause the interference widget 510 to be hidden, and no longer displayed on the UI 504.

Figure 6:
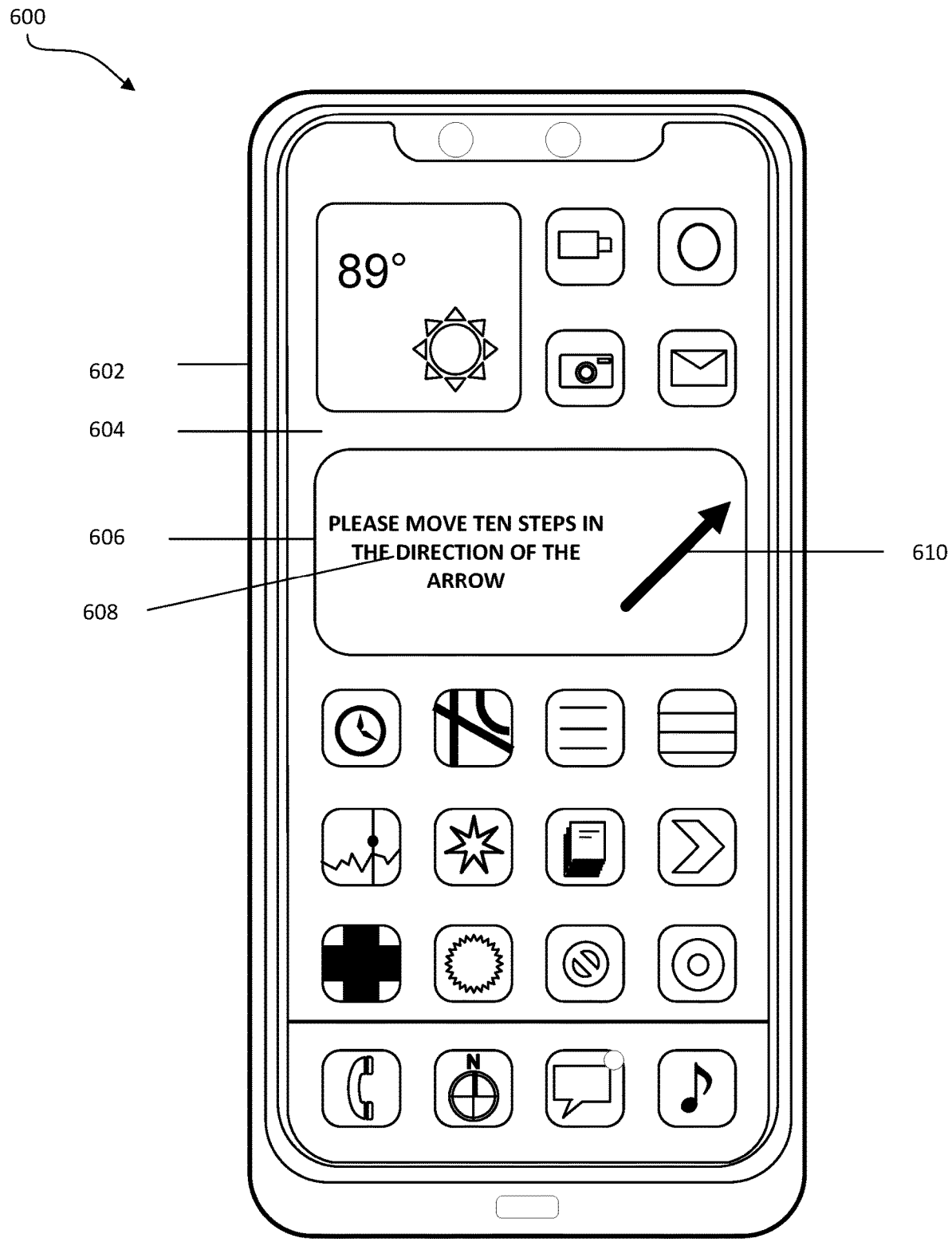
FIG. 6 is an illustration of a user interface (UI) displayed on a user device, in accordance with one or more embodiments.

FIG. 6 is an illustration 600 of a user interface (UI) displayed on a user device, in accordance with one or more embodiments. A user device 602 can include a UI 604. The UI 604 can include an interference widget 606. In addition to notifying the user that another device is causing interference, the interference widget 606 can provide textual instructions 608 and visual instructions 610 to mitigate the interference caused by the other device.

The user device 602 can estimate a position of the interference device. For example, the user device 602 can include more than one antenna for receiving a signal arranged about the device. The user device 602 can further apply various techniques to estimate a position of the interfering device using the different antenna. As a signal from the interfering device propagates through the air toward the user device 602, the signal can lose strength. Therefore, if a first antenna collects the interfering signal and a second antenna collects the interfering signal after the first antenna, the signal strength can have decreased between the first antenna and the second antenna. Therefore, by accounting for a position of the antenna and the signal strength, and other factors, the user device 602 can estimate a location of the interfering device.

In addition to estimating a location of the interfering device, the user device can include devices for determining a motion of the user device 602. For example, the user device 602 can include a gyroscope for measuring orientation and angular velocity of the user device 602. The user device can also include an accelerometer for measuring the acceleration of the user device 602.

The user device 602 can estimate a position of the interfering device. Based on the estimated position of the interference device, the user device 602 can determine a direction for the user to move to leave an interference region. The user device 602 can further cause the interference widget to display textual instructions 608 and visual instructions 610. The visual instructions can complement the textual instructions 608. For example, the textual instructions read, "Please move ten steps in the direction of the arrow." The visual instructions 610 can provide visual directions that complement the textual instructions 608. For example, as illustrated, the visual instructions 610 can include an arrow pointing in the directions requested by the textual instructions 608.

The user device 602 can monitor the movements of the user device 602. For example, the user device 602 can rely on measurements taken by the gyroscope and the accelerometer to estimate a movement of the user device 602. Furthermore, the interference widget 606 can be configured to dynamically adjust in response to the movement of the user device 602. For example, if the user moves one step in the direction of the arrow, the gyroscope and accelerometer measurements can be used to determine that user device 602 also moved one step in the direction of the arrow. In response, the user device 602 can cause the interference widget 606 to display, "Please move nine steps in the direction of the arrow." Additionally, if the user moves in the wrong direction, the user device 602 can rely on measurements taken by the gyroscope and the accelerometer to determine a new number of steps to move to leave an interference region. The user device 602 can further cause the interference widget 606 to display new textual instructions 608 and new visual instructions 610.

Figure 7:
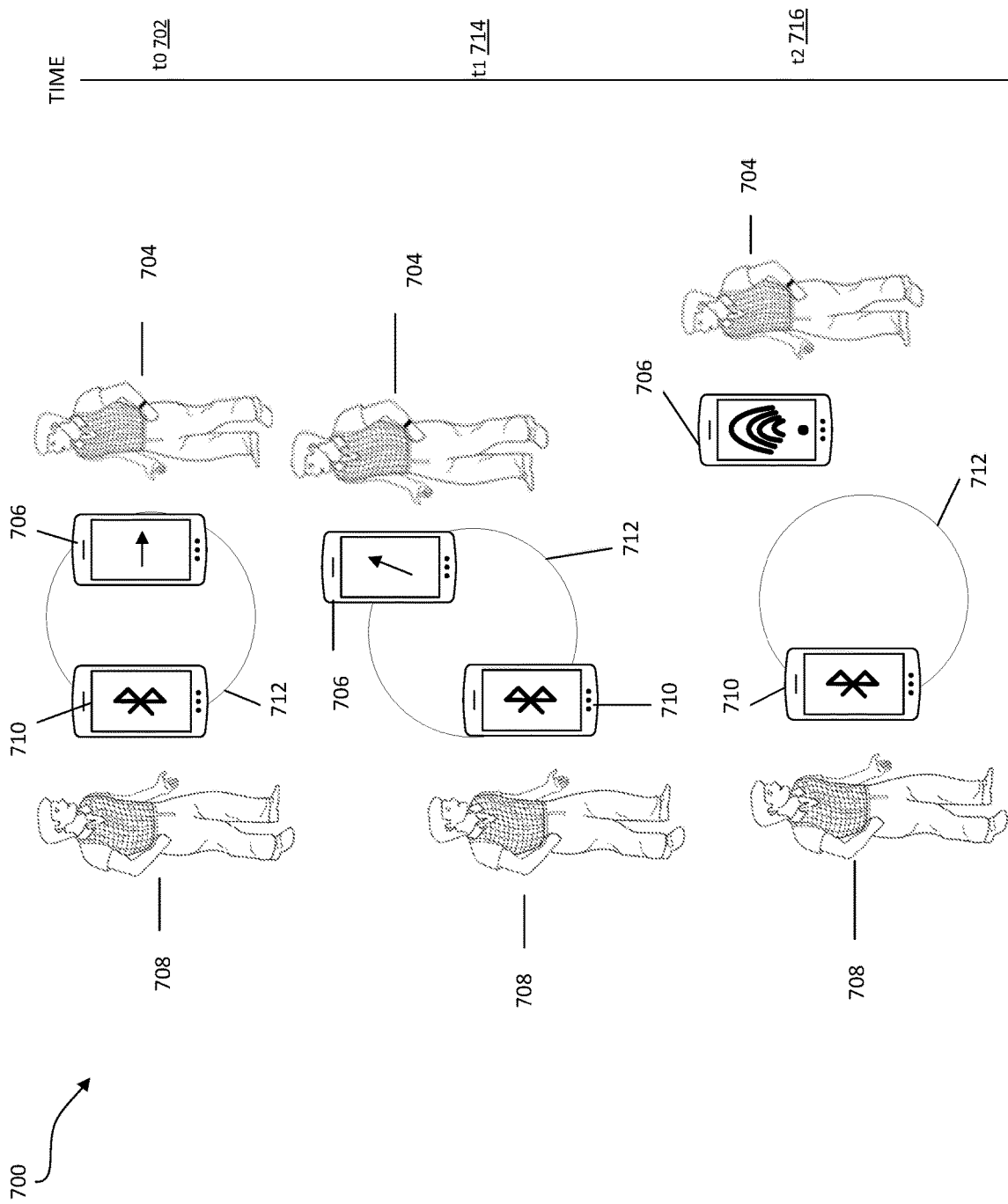
FIG. 7 is an illustration of a providing direction to leave an interference region, according to one or more embodiments.

FIG. 7 is an illustration 700 of a providing direction to leave an interference region, according to one or more embodiments. At a first time, t₀, 702, a first user 704 can use a first device 706 to transmit and receive a communication (e.g., message or telephone call). In some instances, the first user 704 can be in poor cell coverage and area and communicate with a Wi-Fi protocol. Also, at t₀, a second user 708 can use a second device 710. The second device 710 can be transmitting and receiving via a short-range protocol, such as Bluetooth. For example, the second user 708 can be listening to music streamed from a music application on the second device to wireless headphones. Furthermore, the first device 706 and the second device can be transmitting and receiving on close frequencies. The interference region 712 can be a region, where a signal to or from the second device 710 can have a strength such the signal can interfere with a signal to or from the first device 706. The signals being transmitted to and from the second device 710 can create an interference region 712.

The first device 706 can detect the interfering signal and cause an interference widget to be displayed on the UI of the first device 706. In addition to detecting the interfering signal, the first device 706 can estimate a location of the second device 710. Based on the estimated location of the second device 710, the first device 706 can display textual and visual instructions, via an interference widget, to guide the first user 704 out of the interference region 712.

At a second time, $t_1$, 714, the first user 704 can have moved in the direction provided by the interference widget. However, as illustrated, the second user 708 has also moved, and as a result, the first device 706 is still in the interference region 712. The interference region 712 is not a visible region, rather the interference region is a region in which a signal from the second device 710 can have an RSSI value greater than a threshold value. Therefore, the first device 706, can from time to time, determine the RSSI value of an incoming transmission and compare the RSSI value to one or more threshold values. As illustrated, the first device 706 can determine that it is still in the interference region 712 based on the comparison (e.g., the RSSI value is greater than the threshold value). Therefore, the first device 706 can re-estimate a location of the second device 710. Based on the estimate, the first device 706 can cause an interference widget of a UI to display new textual instructions and new visual instructions. The first user 704 can move in accordance with new textual instructions and new visual instructions.

At a third time, $t_2$, 716, the first user 704 can have moved in accordance with the new textual instructions and new visual instructions. As illustrated, the first user 704 has moved outside the interference region 712. Therefore, the first device 706, can determine the RSSI value of an incoming transmission and compare the RSSI value to one or more threshold values. As illustrated, the first device 706 can determine that it is outside of the interference region 712 based on the comparison (e.g., the RSSI value is less than the threshold value). Based on detecting that the first device 706 is itself outside of the interference region 712, the first device 706 can cause the interference widget to become hidden on the UI. Based on being outside of the interference region 712, the first user 704 can communicate via their first device 706, without a signal to or from the second device 710 causing an interference.

Figure 8:
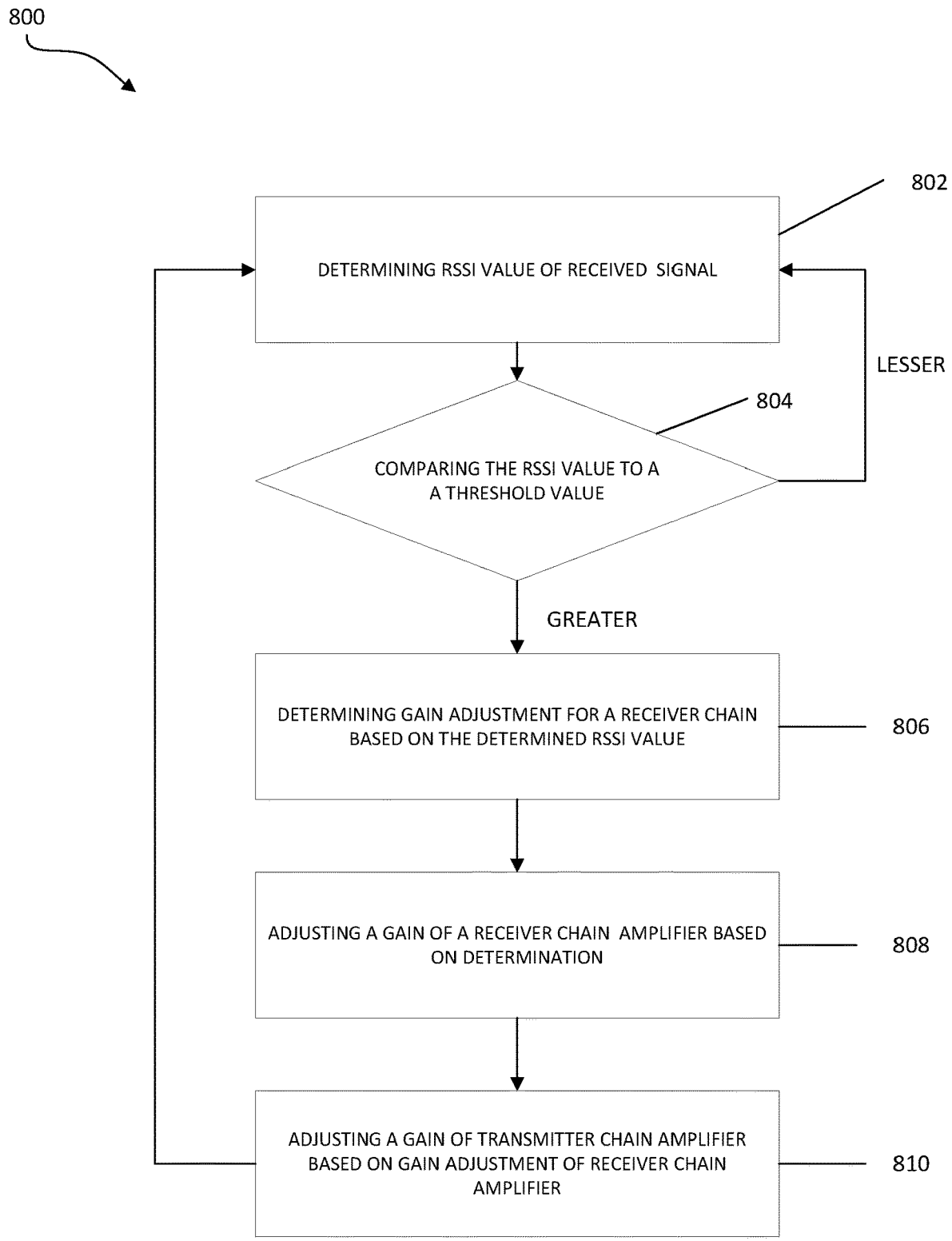
FIG. 8 is a process flow for smart external interference detection and avoidance, according to one or more embodiments.

FIG. 8 is a process flow 800 for smart external interference detection and avoidance, according to one or more embodiments. While the operations of processes 800 and 900 are described as being performed by generic computers, it should be understood that any suitable device (e.g., a reader device, a responder device) may be used to perform one or more operations of these processes. Processes 800 and 900 (described below) are respectively illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

At 802, the method can include a computing device determining the RSSI value of a received intermediate frequency signal. The computing device can sample incoming transmissions having a frequency across the ISM band. The computing device can further determine the RSSI value for a sampled signal. The computing device can be a user device, for example, a smartphone, laptop tablet, or other device operable to communicate via messaging or call. The RSSI can be a position-based value as neither the position of the computing device or any interfering device is required to remain static. Therefore, either the computing device or the interference device can be moved about a common area. The strength of signal from the interfering device can be based on a relative position of the interfering device to the computing device. The closer the interfering device is to the computing device, the stronger the interfering signal can be from the perspective of the computing device. The RSSI value can also be time-based. Both the interfering device and the computing device can operate in a TDD mode where transmission and reception times are sandwiched between guard times. Therefore, even if the interference device is currently engaged in a session, the interfering device can be scheduled for a guard time slot, in which it is not receiving or transmitting. Therefore, the RSSI can be higher or lower depending on whether the interfering device is transmitting or receiving. For example, if the interfering device is scheduled for a guard time slot, the RSSI determined by the computing device can be lower. If, however, the interfering device is scheduled for transmission or reception, the RSSI determined by the computing device can be higher.

At 804, the method can include the computing device determining whether the RSSI is greater than a threshold value. The threshold value can be based on various factors, such as a duplexing mode (e.g., TDD), computing device blocking characteristics, WI-FI strength of signal, base station type, or other appropriate characteristics. The computing device can compare the determined RSSI with the threshold value to determine if the determined RSSI value is greater than the threshold value. In some instances, the computing device can compare more than one determined RSSI values to the threshold value. For example, to ensure that an interfering device is present or scheduled for a guard time slot, the computing device can compare a series of determined RSSI values to the threshold value. The computing device can further determine whether any of the comparisons result in a determined RSSI value greater than the threshold value. If the determined RSSI value(s) is less than the threshold value, the method can return to step 802. If, however, the determined RSSI value(s) is greater than the threshold value, the method can proceed to step 806.

At 806, the method can include the computing device determining a gain adjustment value based on the determined RSSI value that exceeds the threshold value. In some instances, the gain can include reducing a gain at a receiver chain and increasing a gain at a transmitter chain. For example, each of the receiver chain and transmitter can include one or more variable gain amplifiers that can be configured by an automatic gain control (AGC). To determine the gain adjustment, the computing device can access a gain index lookup table. The degree of adjustment can be based on various factors, such as the difference between the determined RSSI value and the threshold value. For example, the greater the difference between the determined RSSI value and the threshold value, the greater the adjustment of the gains at the receiver chain and the transmitter chain.

At 808, the method can include adjusting a gain of a receiver chain amplifier based on the determination. For example, the computing device can retrieve a gain adjustment value from the gain index lookup table and send instructions to an automatic gain control (AGC) to adjust the gain accordingly. At 810, the method can include adjusting a gain of a transmitter chain amplifier based on the determination. For example, the computing device can retrieve a gain adjustment value from the gain index lookup table and send instructions to the automatic gain control (AGC) to adjust the gain accordingly.

Figure 9:
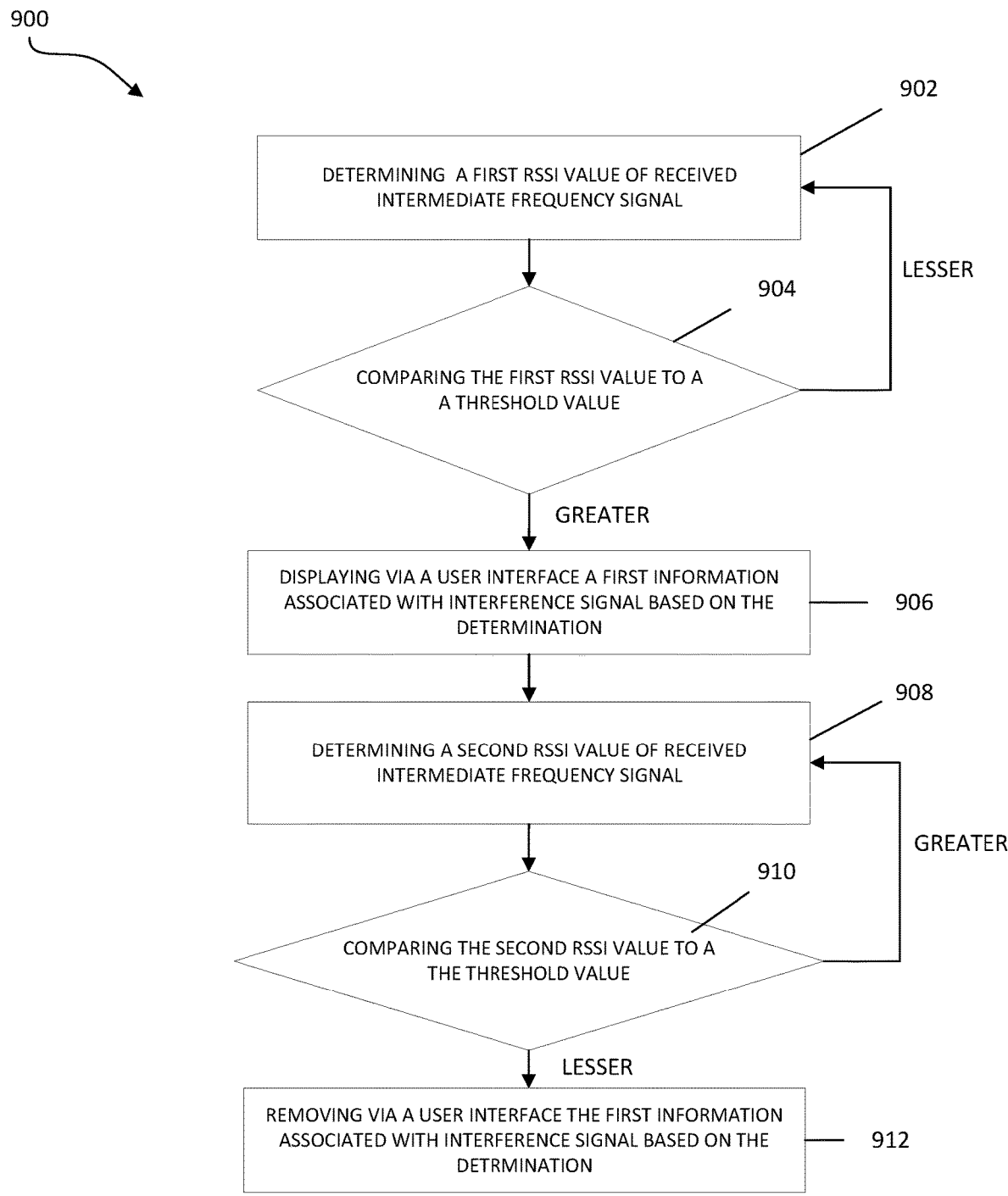
FIG. 9 is a process flow for a UI configured for smart external interference detection and avoidance, according to one or more embodiments.

FIG. 9 is a process flow 900 for a UI configured for smart external interference detection and avoidance, according to one or more embodiments. At 902, the method can include a computing device determining a first RSSI value of a received intermediate frequency signal. The computing device can sample incoming transmissions having a frequency across the ISM band. The computing device can further determine the first RSSI value for each sampled signal. The computing device can be a user device, for example, a smartphone, laptop tablet, or other device operable to communicate via messaging or call. The first RSSI can be a position-based value as neither the position of the computing device or any interfering device is required to remain static. The first RSSI value can also be time-based.

At 904, the method can include the computing device determining whether the first RSSI is greater than a threshold value. The computing device can be configured to hold one or more threshold values. The threshold value can be based on various factors, such as a duplexing mode (e.g., TDD), computing device blocking characteristics, WI-FI strength of signal, base station type, or other appropriate characteristics. The computing device can compare the determined first RSSI with the threshold value to determine if the determined RSSI value is greater than the threshold value. In some instances, the computing device can compare more than one determined first RSSI value to the threshold value. For example, to ensure that an interfering device is present or scheduled for a guard time slot, the computing device can compare a series of determined RSSI value to the threshold value. The computing device can further determine whether any of the comparisons result in a determined first RSSI value greater than the threshold value. If the determined first RSSI value(s) is less than the threshold value, the method can return to step 902. If, however, the determined first RSSI value(s) is greater than the one or more threshold values, the method can proceed to step 906.

At 906, the method can include the computing device displaying, via a UI, a first information associated with an interference signal based on the determination that the first RSSI value is greater than the threshold value. The first information can include a notification that a nearby signal is causing interference with the communication of the computing device. A user of the computing device can use the information to ask another person to turn off their device, or the user can use the information to move away from the interfering device. In other instances, the first information can include a textual information for guiding the user away from the interference signal. In yet other instances, the computing device can in addition to or alternatively display a second information, which can include a visual information (e.g., a pointer) for guiding the user away from the interference signal.

At 908, the method can include the computing device determining a second RSSI value of a received intermediate frequency signal. The computing device can continue to sample incoming transmissions having a frequency across the ISM band as the first information is displayed. The computing device can further determine a second RSSI value subsequent to the first RSSI value.

At 910, the method can include the computing device determining whether the second RSSI is greater than a threshold value. The computing device can be configured to hold one or more threshold values. The threshold values can be based on various factors, such as a duplexing mode (e.g., TDD), computing device blocking characteristics, WI-FI strength of signal, base station type, or other appropriate characteristics. The computing device can compare the determined second RSSI with one or more threshold values to determine if the determined second RSSI value is greater than one or more threshold values. If the determined second RSSI value is greater than the threshold value, the method can return to step 908. If, however, the determined second RSSI value is less than the threshold value, the method can process to step 912

At 912, the method can include the computing device removing, via the user interface, the first information associated with the interference signal based on the determination. The computing device can have caused the first information to be displayed on the UI of the computing device based on the determination that the first RSSI was greater than the threshold value. Displaying the first information can be rearranged the visual elements of the UI (e.g., reducing the size of icons or widgets, moving icons of widgets, removing icons or widgets, including an interference widget). Removing the first information can cause the UI to have the same visual appearance (e.g., same icons and widgets, same arrangement of icons and widgets) as before the first information was displayed.

Figure 10:
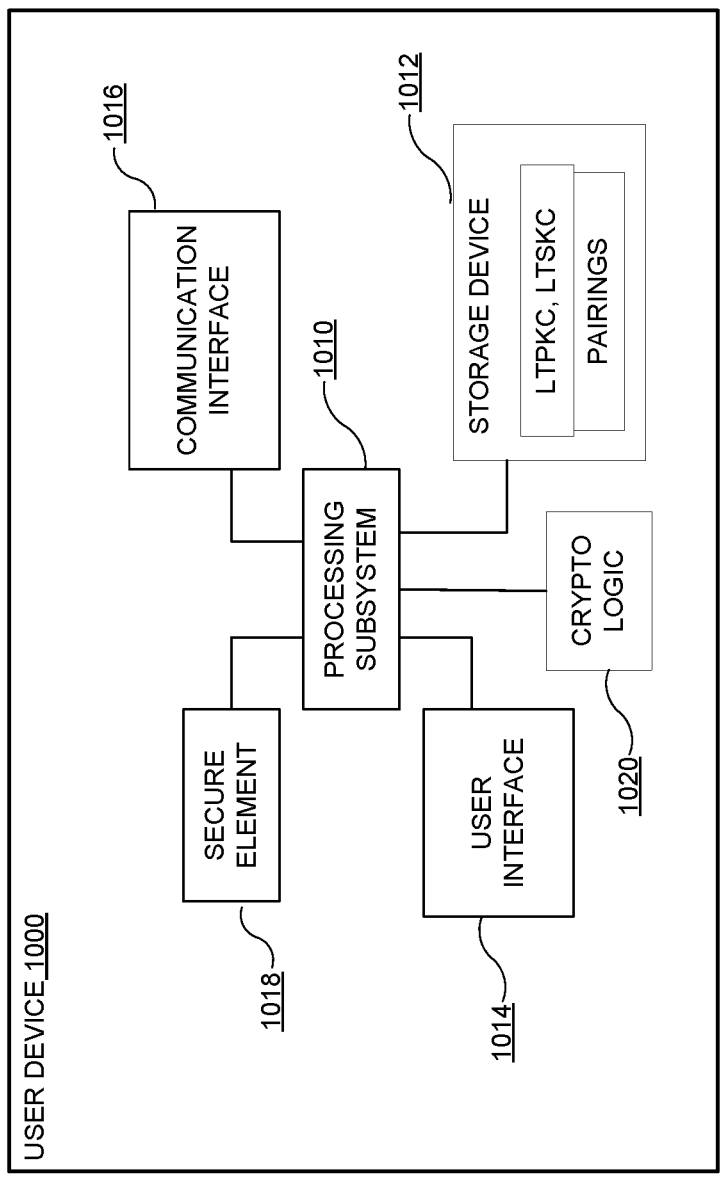
FIG. 10 is a block diagram of a user device, according to one or more embodiments

FIG. 10 is a block diagram of a user device 1000, according to one or more embodiments. User device 1000 can implement any or all of the functions, behaviors, and capabilities described herein, as well as other functions, behaviors, and capabilities not expressly described. User device 1000 can include processing subsystem 1010, storage device 1012, user interface 1014, communication interface 1016, secure element 1018, and cryptographic logic module 1020. User device 1000 can also include other components (not explicitly shown) such as a battery, power controllers, automatic gain controller, gyroscope, accelerometer, and other components operable to provide various enhanced capabilities. In various embodiments, user device 1000 can be implemented in a desktop computer, laptop computer, tablet computer, smart phone, wearable computing device, or other systems having any desired form factor. Further, as noted above, user device 1000 can be implemented partly in a base station and partly in a mobile unit that communicates with the base station and provides a user interface.

Storage device 1012 can be implemented, e.g., using disk, flash memory, or any other non-transitory storage medium, or a combination of media, and can include volatile and/or nonvolatile media. In some embodiments, storage device 1012 can store one or more application and/or operating system programs to be executed by processing subsystem 1010, including programs to implement any or all operations described herein as being performed by a controller. For example, storage device 1012 can store a uniform controller application that can read an accessory definition record and generate a graphical user interface for controlling the accessory based on information therein. In some embodiments, portions (or all) of the controller functionality described herein can be implemented in operating system programs rather than applications. In some embodiments, storage device 1012 can also store apps designed for specific accessories or specific categories of accessories (e.g., displaying information associated with an interference signal).

User interface 1014 can include input devices such as a touch pad, touch screen, scroll wheel, click wheel, dial, button, switch, keypad, microphone, or the like, as well as output devices such as a video screen, indicator lights, speakers, headphone jacks, or the like, together with supporting electronics (e.g., digital to analog or analog to digital convertors, signal processors, or the like). A user can operate input devices of user interface 1014 to invoke the functionality of user device 1000 and can view and/or hear output from user device 1000 via output devices of user interface 1014.

Processing subsystem 1010 can be implemented as one or more integrated circuits, e.g., one or more single core or multi core microprocessors or microcontrollers, examples of which are known in the art. In operation, processing system 1010 can control the operation of user device 1000. In various embodiments, processing subsystem 1010 can execute a variety of programs in response to program code and can maintain multiple concurrently executing programs or processes. At any given time, some or all of the program code to be executed can be resident in processing subsystem 1010 and/or in storage media such as storage device 1012.

Through suitable programming, processing subsystem 1010 can provide various functionality for user device 1000. For example, in some embodiments, processing subsystem 1010 can implement various processes (or portions thereof) described above as being implemented by a controller. Processing subsystem 1010 can also execute other programs to control other functions of user device 1000, including programs that may be stored in storage device 1012. In some embodiments, these programs may interact with an accessory, e.g., by generating messages to be sent to the accessory and/or receiving messages from the accessory. Such messages can conform to a uniform accessory protocol as described above.

Communication interface 1016 can provide voice and/or data communication capability for user device 1000. In some embodiments communication interface 1016 can include radio frequency (RF) transceiver components for accessing wireless voice and/or data networks (e.g., using cellular telephone technology, data network technology such as 3G, 4G/LTE, Wi Fi (IEEE 802.11 family standards), or other mobile communication technologies, or any combination thereof), components for short range wireless communication (e.g., using Bluetooth and/or Bluetooth LE standards, NFC, etc.), and/or other components. In some embodiments communication interface 1016 can provide wired network connectivity (e.g., Ethernet) in addition to or instead of a wireless interface. Communication interface 1016 can be implemented using a combination of hardware (e.g., driver circuits, antennas, modulators/demodulators, encoders/decoders, and other analog and/or digital signal processing circuits) and software components. In some embodiments, communication interface 1016 can support multiple communication channels concurrently, using the same transport or different transports.

Secure element 1018 can be an integrated circuit or the like that can securely store cryptographic information for user device 1000. Examples of information that can be stored within secure element 1018 include the controller's long-term public and secret keys (LTPKC, LTSKC as described above), and a list of paired accessories (e.g., a lookup table that maps accessory ID to accessory long term public key LTPKA for accessories that have completed a pair setup or pair add process as described above).

In some embodiments, cryptographic operations can be implemented in a cryptographic logic module 1020 that communicates with secure element 1018. Physically, cryptographic logic module 1020 can be implemented in the same integrated circuit with secure element 1018 or a different integrated circuit (e.g., a processor in processing subsystem 1010) as desired. Cryptographic logic module 1020 can include various logic circuits (fixed or programmable as desired) that implement or support cryptographic operations of user device 1000, including any or all cryptographic operations described above. Secure element 1018 and/or cryptographic logic module 1020 can appear as a "black box" to the rest of user device 1000. Thus, for instance, communication interface 1016 can receive a message in encrypted form that it cannot decrypt and can simply deliver the message to processing subsystem 1010. Processing subsystem 1010 may also be unable to decrypt the message, but it can recognize the message as encrypted and deliver it to cryptographic logic module 1020. Cryptographic logic module 1020 can decrypt the message (e.g., using information extracted from secure element 1018) and determine what information to return to processing subsystem 1010. As a result, certain information can be available only within secure element 1018 and cryptographic logic module 1020. If secure element 1018 and cryptographic logic module 1020 are implemented on a single integrated circuit that executes code only from an internal secure repository, this can make extraction of the information extremely difficult, which can provide a high degree of security. Other implementations are also possible.

Thus, although specific embodiments have been described, it will be appreciated that embodiments may include all modifications and equivalents within the scope of the following claims.

As described above, one aspect of the present technology is the gathering and use of data available from specific and legitimate sources to improve the delivery of messages from one device to one or more devices. The present disclosure contemplates that in some instances, this gathered data may include personal information data that uniquely identifies or may be used to identify a specific person. Such personal information data may include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, may be used to the benefit of users. For example, the personal information data may be used to deliver a command from a user profile on a computing device to one or more computing devices. Further, other uses for personal information data that benefit the user are also contemplated by the present disclosure. For instance, specific states of devices (e.g., medical care related devices, fitness devices, etc.) associated with the user may be transmitted from a device back to the user profile.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities may subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements may be provided to prevent or block access to such personal information data. For example, such as in the case of token generation services, the present technology may be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Illustrative techniques for using a computing device to delegate authority to generate a token from an owner to a sharing platform and provisioning the token by the sharing platform. Some or all of these techniques may, but need not, be implemented at least partially by as those shown at least in FIGS. 1-9 above. While many of the embodiments are described above with reference to computing devices and user devices, it should be understood that other types of computing devices may be suitable to perform the techniques disclosed herein. Further, in the foregoing description, various non-limiting examples were described. For purposes of explanation, specific configurations and details are set forth in order to provide a thorough understanding of the examples. However, it should also be apparent to one skilled in the art that the examples may be practiced without the specific details. Furthermore, well-known features were sometimes omitted or simplified in order not to obscure the example being described.

The various embodiments further can be implemented in a wide variety of operating environments, which in some cases can include one or more user computers, computing devices or processing devices that can be used to operate any of a number of applications. User or client devices can include any of a number of general-purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a network server, the network server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase®, and IBM®

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Non-transitory storage media and computer-readable storage media for containing code, or portions of code, can include any appropriate media known or used in the art such as, but not limited to, volatile and non-volatile, removable and non-removable media implemented in any method or technology for storage of information such as computer-readable instructions, data structures, program modules or other data, including RAM, ROM, Electrically Erasable Programmable Read-Only Memory (EEPROM), flash memory or other memory technology, CD-ROM, DVD or other optical storage, magnetic cassettes, magnetic tape, magnetic disk storage or other magnetic storage devices or any other medium that can be used to store the desired information and that can be accessed by the a system device. Based at least in part on the disclosure and teachings provided herein, a person of ordinary skill in the art will appreciate other ways and/or methods to implement the various embodiments. However, computer-readable storage media does not include transitory media such as carrier waves or the like.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a," "an," and "the," and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based at least in part on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method, comprising:
   determining, by a first computing device, a first received signal strength indicator (RSSI) value of a received first signal across a radio band, wherein the first RSSI value is based at least in part on a second signal transmitted by a second computing device;
   comparing, by the first computing device, the first RSSI value with a threshold value;
   determining, by the first computing device, a first gain adjustment value for a receiver chain of the first computing device and a second gain adjustment value of a transmitter chain of the first computing device based at least in part on the comparison;
   adjusting, by the first computing device, a first gain of a first amplifier of the receiver chain based at least in part on the first gain adjustment value; and
   adjusting, by the first computing device, a second gain of a second amplifier of the transmitter chain based at least in part on the second gain adjustment value.

2. The method of claim 1, wherein determining the first gain adjustment comprises:
   accessing a lookup table comprising a set of gain adjustment values; and
   retrieving the first gain adjustment value from the set of gain adjustment values, wherein the first gain adjustment value is based at least in part on a difference between the determined first RSSI value and the threshold value.

3. The method of claim 1, wherein adjusting the first gain of the first amplifier of the receiver chain comprises lowering the first gain based at least in part on the comparison.

4. The method of claim 1, wherein adjusting the second gain of the second amplifier of the transmitter chain comprises raising the second gain based at least in part on the comparison, and responsive to adjusting the first gain.

5. The method of claim 1, wherein the method further comprises displaying, via a user interface (UI), a first information item associated with the second signal transmitted by the second computing device, wherein the first information item comprises textual information and the displaying is based at least in part on comparing the first RSSI value and the threshold value.

6. The method of claim 5, wherein the method further comprises displaying a second information item associated with the second signal transmitted by the second computing device, wherein the second information item comprises a visual directional marker for moving the first computing device.

7. The method of claim 5, wherein the method further comprises:
   determining a second RSSI value of a received second signal across the radio band, wherein the second RSSI value is based at least in part on a second signal transmitted by the second computing device;
   comparing the second RSSI value with the threshold value; and
   ceasing display of the first information item based at least in part on the comparison.

8. A first computing device, comprising:
   a processor; and
   a computer-readable medium including instructions that, when executed by the processor, cause the processor to perform operations comprising:
      determining a first received signal strength indicator (RSSI) value of a received first signal across a radio band, wherein the first RSSI value is based at least in part on a second signal transmitted by a second computing device;
      comparing the first RSSI value with a threshold value;
      determining a first gain adjustment value for a receiver chain of the first computing device and a second gain adjustment value of a transmitter chain of the first computing device based at least in part on the comparison;
      adjusting a first gain of a first amplifier of the receiver chain based at least in part on the first gain adjustment value; and
      adjusting a second gain of a second amplifier of the transmitter chain based at least in part on the second gain adjustment value.

9. The first computing device of claim 8, wherein determining the first gain adjustment comprises:
accessing a lookup table comprising a set of gain adjustment values; and
retrieving the first gain adjustment value from the set of gain adjustment values, wherein the first gain adjustment value is based at least in part on a difference between the determined first RSSI value and the threshold value.

10. The first computing device of claim 8, wherein adjusting the first gain of the first amplifier of the receiver chain comprises lowering the first gain based at least in part on the comparison.

11. The first computing device of claim 8, wherein adjusting the second gain of the second amplifier of the transmitter chain comprises raising the second gain based at least in part on the comparison and responsive to adjusting the first gain.

12. The first computing device of claim 8, wherein the instructions that, when executed by the processor, further cause the processor to perform operations comprising displaying, via a user interface (UI), a first information item associated with the second signal transmitted by the second computing device, wherein the first information item comprises textual information and the displaying is based at least in part on comparing the first RSSI value and the threshold value.

13. The first computing device of claim 12, wherein the instructions that, when executed by the processor, further cause the processor to perform operations comprising displaying a second information item associated with the second signal transmitted by the second computing device, wherein the second information item comprises a visual directional marker for moving the first computing device.

14. The first computing device of claim 12, wherein the instructions that, when executed by the processor, further cause the processor to perform operations comprising:
determining a second RSSI value of a received second signal across the industrial, scientific, and medical (ISM) band, wherein the second RSSI value is based at least in part on a second signal transmitted by the second computing device;
comparing the second RSSI value with the threshold value; and
ceasing display of the first information item based at least in part on the comparison.

15. A computer-readable medium having stored thereon a sequence of instructions which, when executed, causes a processor to perform operations comprising:
determining a first received signal strength indicator (RSSI) value of a first signal receiving by a first computing device across an industrial, scientific, and medical (ISM) band, wherein the first RSSI value is based at least in part on a second signal transmitted by a second computing device;
comparing the first RSSI value with a threshold value;
determining a first gain adjustment value for a receiver chain of the first computing device and a second gain adjustment value of a transmitter chain of the first computing device based at least in part on the comparison;
adjusting a first gain of a first amplifier of the receiver chain based at least in part on the first gain adjustment value; and
adjusting a second gain of a second amplifier of the transmitter chain based at least in part on the second gain adjustment value.

16. The computer-readable medium of claim 15, wherein determining the first gain adjustment comprises:
accessing a lookup table comprising a set of gain adjustment values; and
retrieving the first gain adjustment value from the set of gain adjustment values, wherein the first gain adjustment value is based at least in part on a difference between the determined first RSSI value and the threshold value.

17. The computer-readable medium of claim 15, wherein adjusting the first gain of the first amplifier of the receiver chain comprises lowering the first gain of the first amplifier based at least in part on the comparison.

18. The computer-readable medium of claim 15, wherein adjusting the second gain of the second amplifier of the transmitter chain comprises raising the second gain based at least in part on the comparison and responsive to adjusting the first gain.

19. The computer-readable medium of claim 15, wherein the instructions that, when executed by the processor, further cause the processor to perform operations comprising displaying, via a user interface (UI), a first information item associated with the second signal transmitted by the second computing device, wherein the first information item comprises textual information and the displaying is based at least in part on comparing the first RSSI value and the threshold value.

20. The computer-readable medium of claim 19, wherein the instructions that, when executed by the processor, further cause the processor to perform operations comprising:
determining a second RSSI value of a received second signal across the industrial, scientific, and medical (ISM) band, wherein the second RSSI value is based at least in part on a second signal transmitted by the second computing device;
comparing the second RSSI value with the threshold value; and
ceasing display of the first information item based at least in part on the comparison.

* * * * *